(12) United States Patent
Li et al.

(10) Patent No.: US 10,607,066 B2
(45) Date of Patent: Mar. 31, 2020

(54) LIVING BODY IDENTIFICATION METHOD, INFORMATION GENERATION METHOD, AND TERMINAL

(71) Applicant: Tencent Technology (Shenzhen) Company Limited, Shenzhen (CN)

(72) Inventors: Jilin Li, Shenzhen (CN); Chengjie Wang, Shenzhen (CN); Feiyue Huang, Shenzhen (CN); Yongjian Wu, Shenzhen (CN); Hui Ni, Shenzhen (CN); Ruixin Zhang, Shenzhen (CN); Guofu Tan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/462,423

(22) Filed: Mar. 17, 2017

(65) Prior Publication Data
US 2017/0193287 A1 Jul. 6, 2017

Related U.S. Application Data

(63) Continuation of application No. PCT/CN2016/079893, filed on Apr. 21, 2016.

(30) Foreign Application Priority Data

Apr. 30, 2015 (CN) .......................... 2015 1 0218901

(51) Int. Cl.
*G06K 9/00* (2006.01)
*G06T 7/246* (2017.01)

(52) U.S. Cl.
CPC ..... *G06K 9/00302* (2013.01); *G06K 9/00228* (2013.01); *G06K 9/00315* (2013.01);
(Continued)

(58) Field of Classification Search
None
See application file for complete search history.

(56) References Cited

U.S. PATENT DOCUMENTS

2008/0192980 A1  8/2008  Park et al.
2013/0016882 A1* 1/2013  Cavallini ............... G06K 9/629
                                              382/117
(Continued)

FOREIGN PATENT DOCUMENTS

CN  103324918 A  9/2013
CN  104348778 A  2/2015
(Continued)

OTHER PUBLICATIONS

International Search Report and Written Opinion dated Jul. 26, 2016 for PCT Application No. PCT/CN2016/079893, 11 pages.
(Continued)

*Primary Examiner* — Fred H Hu
(74) *Attorney, Agent, or Firm* — Brinks Gilson & Lione

(57) ABSTRACT

The present disclosure discloses a living body identification method, an information generation method, and a terminal, and belongs to the field of biometric feature recognition. The method includes: providing lip language prompt information, the lip language prompt information including at least two target characters, and the at least two target characters being at least one of: characters of a same lip shape, characters of opposite lip shapes, or characters whose lip shape similarity is in a preset range; collecting at least two frame pictures; detecting whether lip changes of a to-be-identified object in the at least two frame pictures meet a preset condition, when the to-be-identified object reads the at least two target characters; and determining that the to-be-identified object is a living body, if the preset condition is met. The present disclosure resolves a problem in the related technology that even if a to-be-identified object
(Continued)

performs an operation according to lip language prompt information, a terminal may incorrectly determine that the to-be-identified object is not a living body, and achieves an effect that the terminal can accurately determine whether the to-be-identified object is a living body and improve determining accuracy.

17 Claims, 9 Drawing Sheets

(52) U.S. Cl.
CPC .......... *G06K 9/00906* (2013.01); *G06T 7/246* (2017.01); *G06T 2207/30201* (2013.01)

(56) References Cited

U.S. PATENT DOCUMENTS

| 2013/0054240 A1* | 2/2013 | Jang ................ G06K 9/6292 |
| | | 704/235 |
| 2013/0226587 A1* | 8/2013 | Cheung ............ G06K 9/00335 |
| | | 704/273 |
| 2017/0039440 A1* | 2/2017 | Li ...................... G10L 17/22 |

FOREIGN PATENT DOCUMENTS

| CN | 104376250 A | 2/2015 |
| EP | 2546782 A1 | 1/2013 |

OTHER PUBLICATIONS

Office Action dated Jun. 5, 2019 for Chinese Application No. 201510218901.2 including concise English Translation, 9 pages.

\* cited by examiner

LIVING BODY IDENTIFICATION METHOD, INFORMATION GENERATION METHOD, AND TERMINAL

RELATED APPLICATION

The application is a continuation application of PCT Patent Application No. PCT/CN2016/079893, filed on Apr. 21, 2016, which claims priority to China Patent Application No. 201510218901.2, filed with the Chinese Patent Office on Apr. 30, 2015, both of which are incorporated herein by reference in their entireties.

FIELD OF THE TECHNOLOGY

Embodiments of the present invention relate to the field of biometric feature recognition, and in particular, to a living body identification method, an information generation method, and a terminal.

BACKGROUND OF THE DISCLOSURE

With development of biometric feature recognition technologies, facial recognition has become one of commonly-used technologies for determining a user identity. However, to prevent a lawbreaker from stealing a user picture and performing unlawful identification by using the picture, living body identification has become a commonly-used method for facial recognition.

A related living body identification method is: providing, by a terminal, lip language prompt information for a to-be-identified object; collecting at least two frame pictures, and detecting whether lip changes of the to-be-identified object in the at least two frame pictures match lip changes in the lip language prompt information; and if the lip changes of the to-be-identified object in the at least two frame pictures match the lip changes in the lip language prompt information, determining that the to-be-identified object is a living body.

During a process of implementing the present disclosure, the inventor finds that the related technology has at least the following problems: Different users may have different lip shapes when uttering a same character (for example, lip shapes are different when a character is read in standard mandarin and in a local dialect, and lip shapes are different when a character is read in Chinese and in English). As a result, even if a to-be-identified object performs an operation according to lip language prompt information, a terminal may incorrectly determine that the to-be-identified object is not a living body.

SUMMARY

According to a first aspect, a living body identification method is provided, the method including:

providing lip language prompt information, the lip language prompt information including at least two target characters, and the at least two target characters being at least one of: characters of a same lip shape, characters of opposite lip shapes, or characters whose lip shape similarity is in a preset range;

collecting at least two frame pictures;

detecting whether lip changes of a to-be-identified object in the at least two frame pictures meet a preset condition, when the to-be-identified object reads the at least two target characters; and determining that the to-be-identified object is a living body, when the preset condition is met.

According to a second aspect, a living body identification apparatus is provided, the apparatus including:

an information provision module, configured to provide lip language prompt information, the lip language prompt information including at least two target characters, and the at least two target characters being at least one of: characters of a same lip shape, characters of opposite lip shapes, or characters whose lip shape similarity is in a preset range;

a picture collection module, configured to collect at least two frame pictures;

a detection module, configured to detect whether lip changes of a to-be-identified object in the at least two frame pictures collected by the picture collection module meet a preset condition, when the to-be-identified object reads the at least two target characters; and a result determining module, configured to determine that the to-be-identified object is a living body, when a detection result of the detection module is that the preset condition is met.

According to a third aspect, a terminal is provided, the terminal including:

a memory storing at least one set of instructions;

at least one processor in communication with the memory; and when the at least one processor executes the at least one set of the instructions, the at least one processor is configured to cause the terminal to perform:

providing lip language prompt information, wherein the lip language prompt information includes at least two target characters, and the at least two target characters are at least one of: characters of a same lip shape, characters of opposite lip shapes, or characters whose lip shape similarity is in a preset range;

collecting at least two frame pictures;

detecting whether lip changes of a to-be-identified object in the at least two frame pictures meet a preset condition, when the to-be-identified object reads the at least two target characters; and determining that the to-be-identified object is a living body, when the preset condition is met.

According to a fourth aspect, a method for generating lip language prompt information that is used for living body identification is provided, the method including:

generating lip language prompt information according to a preset rule, the lip language prompt information including at least two target characters, the at least two target characters being at least one of: characters of a same lip shape, characters of opposite lip shapes, or characters whose lip shape similarity is in a preset range, and the lip language prompt information being used to instruct a terminal to identify whether a to-be-identified object is a living body according to the lip language prompt information.

The technical solutions provided in the embodiments of the present invention have the following beneficial effects:

At least two target characters are set in lip language prompt information, whether lip changes of a to-be-identified object in collected at least two frame pictures meet a preset condition is detected, when the to-be-identified object reads the at least two target characters; and it is determined that the to-be-identified object is a living body, when a detection result is that the preset condition is met. The at least two target characters are at least one of: characters of the same lip shape, characters of opposite lip shapes, or characters whose lip shape similarity is in a preset range. The embodiments of the present invention resolve a problem in the related technology that even if a to-be-identified object performs an operation according to lip language prompt information, a terminal may incorrectly determine that the to-be-identified object is not a living body, and achieve an effect that the terminal can accurately determine whether the to-be-identified object is a living body and improve determining accuracy.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure more clearly, the following further describes the present disclosure in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

A terminal described in the embodiments of the present invention may be a terminal with a photographing function such as a mobile phone, a tablet computer, an e-book reader, a moving picture experts group audio layer III (MP3) player, a moving picture experts group audio layer IV (MP4) player, a portable laptop computer, or a desktop computer.

A lip change described in the embodiments of the present invention includes any one of a lip shape change, a lip texture change, or a lip color change. A lip picture sequence includes any one of a lip shape sequence, a lip texture sequence, or a lip color sequence. When the lip change is the lip shape change, the lip picture sequence is the lip shape sequence; when the lip change is the lip texture change, the lip picture sequence is the lip texture sequence; when the lip change is the lip color change, the lip picture sequence is the lip color sequence.

Figure 1:
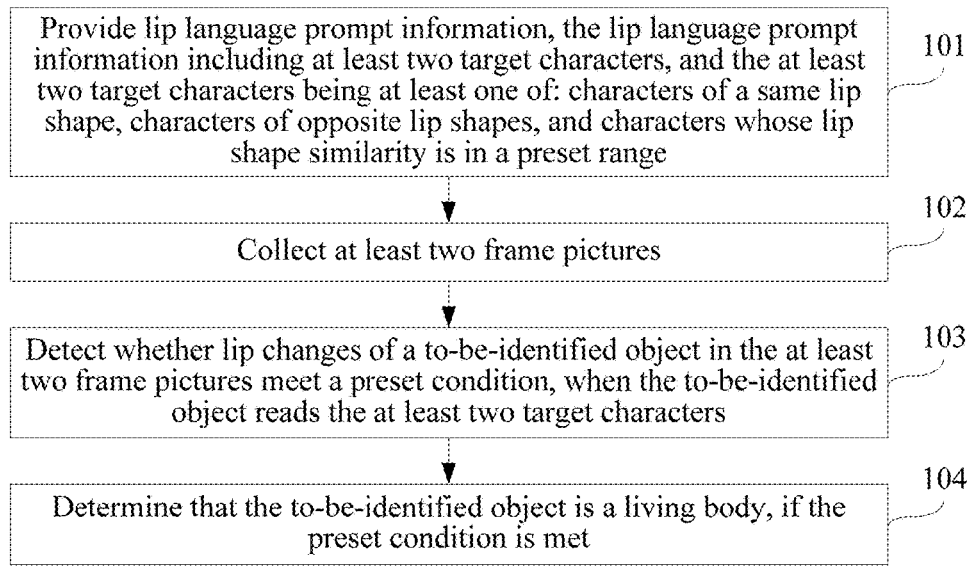
FIG. 1 is a flowchart of a living body identification method according to an embodiment of the present invention.

Referring to FIG. 1, FIG. 1 is a flowchart of a living body identification method according to an embodiment of the present invention. The method includes:

Step 101: Provide lip language prompt information, the lip language prompt information including at least two target characters, and the at least two target characters being at least one of: characters of a same lip shape, characters of opposite lip shapes, or characters whose lip shape similarity is in a preset range.

Step 102: Collect at least two frame pictures.

Step 103: Detect whether lip changes of a to-be-identified object in the at least two frame pictures meet a preset condition, when the to-be-identified object reads the at least two target characters.

Step 104: Determine that the to-be-identified object is a living body, if the preset condition is met.

In conclusion, according to the living body identification method provided in this embodiment, at least two target characters are set in lip language prompt information, whether lip changes of a to-be-identified object in collected at least two frame pictures meet a preset condition is detected, when the to-be-identified object reads the at least two target characters; and it is determined that the to-be-identified object is a living body, when a detection result is that the preset condition is met. The at least two target characters are at least one of: characters of the same lip shape, characters of opposite lip shapes, or characters whose lip shape similarity is in a preset range. The living body identification method resolves a problem in the related technology that even if a to-be-identified object performs an operation according to lip language prompt information, a terminal may incorrectly determine that the to-be-identified object is not a living body, and achieves an effect that the terminal can accurately determine whether the to-be-identified object is a living body and improve determining accuracy.

Figure 2A:
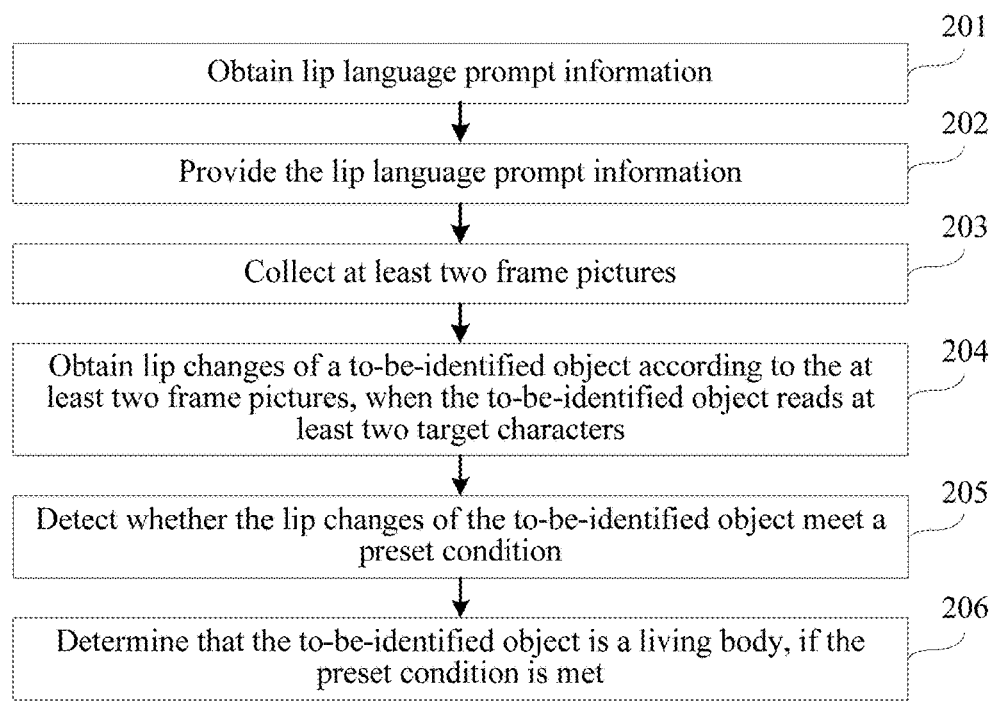
FIG. 2A is a flowchart of a living body identification method according to another embodiment of the present invention.

Referring to FIG. 2A, FIG. 2A is a flowchart of a living body identification method according to another embodiment of the present invention. The method includes:

Step 201: Obtain lip language prompt information.

A terminal may first obtain the lip language prompt information. The lip language prompt information is a random character string. The random character string includes at least two target characters, and the at least two target characters are at least one of: characters of the same lip shape, characters of opposite lip shapes, or characters whose lip shape similarity is in a preset range.

The characters of the same lip shape may include a same character that appears at least twice, or different characters of a same lip shape or different characters whose lip shape similarity is greater than a preset threshold, or include a combination thereof.

Figure 2B:
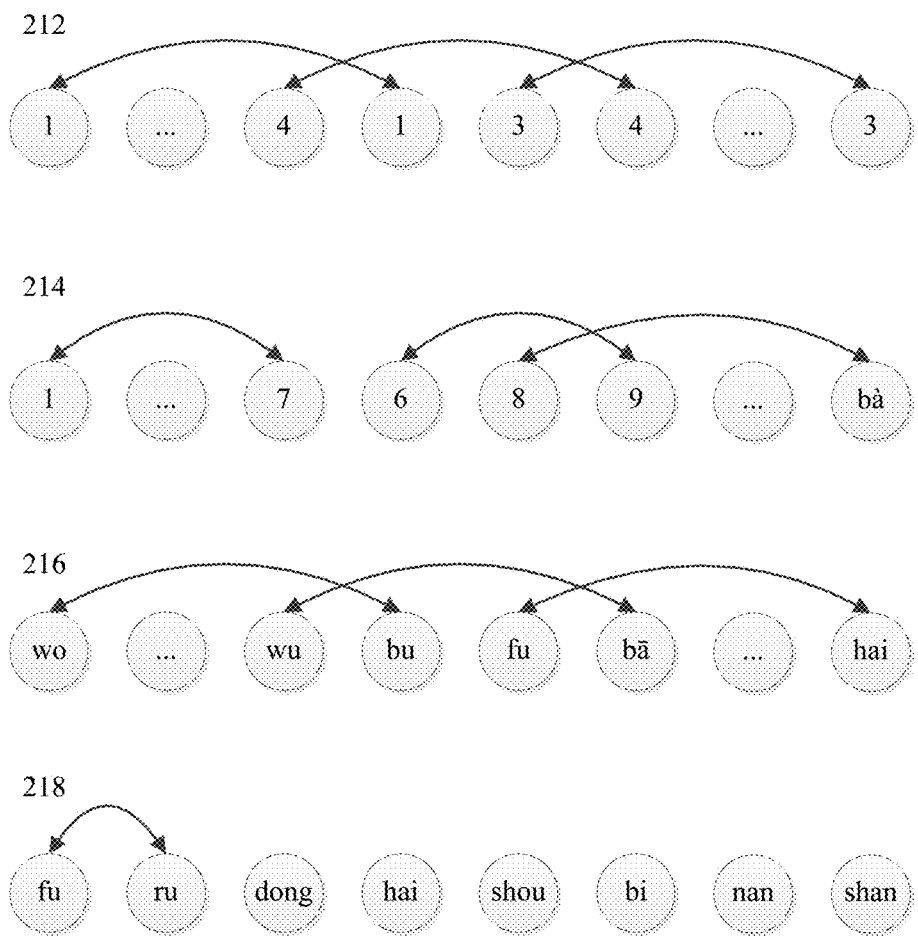
FIG. 2B is a schematic diagram of lip language prompt information according to another embodiment of the present invention.

For example, the lip language prompt information includes characters of a same lip shape, and the characters of the same lip shape include a same character that appears at least twice. Example 212 in FIG. 2B shows possible lip language prompt information.

Optionally, the lip language prompt information may include at least two groups of characters of same lip shapes, and there may be two or more characters of a same lip shape in each group. For example, the lip language prompt information includes three '1' and two '4', and the lip language prompt information may be '102410134'.

For example, the lip language prompt information includes characters of a same lip shape, and the characters of the same lip shape include different characters of a same lip shape or different characters whose lip shape similarity is greater than a preset threshold. In Pinyin, a romanization system for the Chinese language, 'yi' and 'qi', 'liu' and 'jiu', 'bā' and 'ba', 'B' and 'P', and 'D' and 'E' each are different characters of a same lip shape. Example 214 in FIG. 2B shows possible lip language prompt information. Optionally, the lip language prompt information may include at least two groups of characters of same lip shapes, and there may be two or more characters of a same lip shape in each group. This is not limited in this embodiment.

The characters of opposite lip shapes refer to characters that are different literally and have opposite lip language pronunciation rules. 'Gu' and 'ah', 'fu' and 'hai', 'tu' and 'bang', 'wo' and 'bu', and 'wu' and 'ba' each are characters of opposite lip shapes. Example 216 in FIG. 2B shows possible lip language prompt information. Optionally, the lip language prompt information may include at least two groups of characters of opposite lip shapes, and there may be two or more characters of opposite lip shapes in each group. This is not limited in this embodiment.

Certainly, the lip language prompt information may further include at least two target characters whose lip shape similarity is in the preset range, that is, the lip language prompt information may include at least two characters whose lip shape changes are stably similar. The preset range is a range formed by a first threshold and a second threshold, the first threshold is a value greater than 0, and the second threshold is a value less than 1. For example, the preset range is 0.4 to 0.6. Specifically, lip shapes of 'fu' and 'ru' are neither the same nor opposite, lip shape changes of the two are relatively stable, and a similarity between the lip shape changes of the two is between 0.4 and 0.6. Therefore, referring to example 218 in FIG. 2B, the lip language prompt information may be information such as 'fu ru dong hai, and shou bi nan shan' that includes 'fu' and 'ru'.

It should be noted that an ellipsis in FIG. 2B represents any quantity of any characters. This is not limited in this embodiment. Moreover, only an example in which the lip language prompt information only includes characters of the same lip shape, characters of opposite lip shapes, or characters whose lip shape similarity is in the preset range is used above. Optionally, the lip language prompt information may further include any two or three types of the foregoing characters. For example, the lip language prompt information may be '13572468' ('yi' and 'qi' are characters of a same lip shape, and 'wu' and 'ba' are characters of opposite lip shapes).

In addition, the lip language prompt information may be information generated by a terminal, or may be information obtained by a terminal from a server. Therefore, the step may include the following two possible implementation manners.

In a first implementation manner, the lip language prompt information that includes the at least two target characters is generated.

The terminal may randomly generate the lip language prompt information. Optionally, the terminal may store lip language prompt information generated in advance to an information library, and randomly select the lip language prompt information from the information library.

In a second implementation manner, the lip language prompt information that includes the at least two target characters is obtained from the server, the lip language prompt information being information generated by the server in advance.

When the lip language prompt information is information generated by the server, the terminal may send an information obtaining request to the server, and receive the lip language prompt information randomly returned by the server. The lip language prompt information may be information randomly generated by the server.

Optionally, the terminal may obtain the lip language prompt information when the terminal detects that a collected picture includes a human face. For example, when the terminal detects that a collected picture includes a human face, the terminal randomly generates lip language prompt information, or selects, from the information library, a group of lip language prompt information that is stored in advance. For another example, when the terminal detects that a collected picture includes a human face, the terminal sends an information obtaining request to the server, the information obtaining request being used to request to obtain a group of lip language prompt information, and receives the lip language prompt information returned by the server.

Step 202: Provide the lip language prompt information.

Optionally, in a first possible implementation manner, the terminal displays the lip language prompt information in a text form.

Figure 2C:
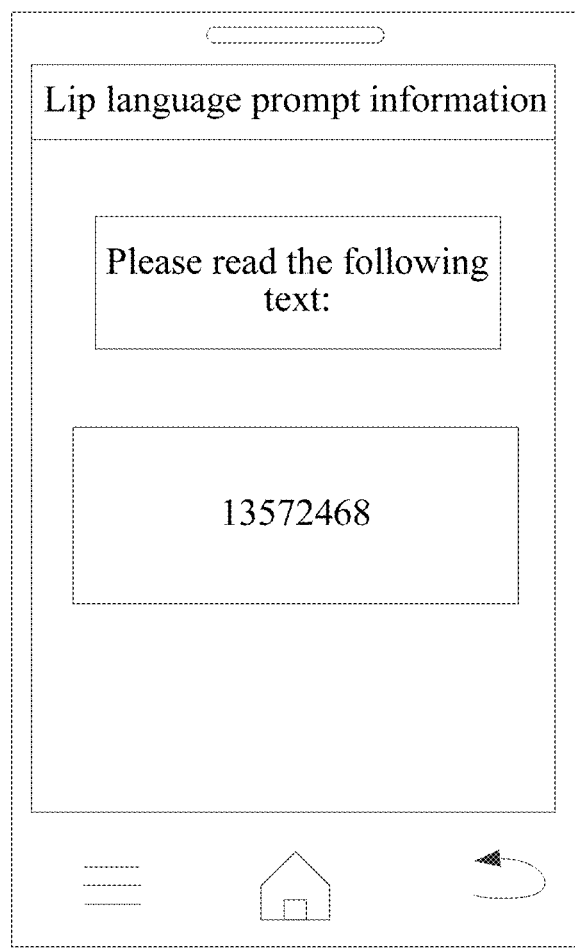
FIG. 2C is a schematic diagram of presenting, by a terminal, lip language prompt information according to another embodiment of the present invention.

For example, the lip language prompt information is '13572468'. Referring to FIG. 2C, the terminal may display the lip language prompt information shown in FIG. 2C.

Optionally, in a second possible implementation manner, the terminal displays the lip language prompt information in a video form.

Optionally, in a third possible implementation manner, the terminal plays the lip language prompt information in an audio form.

To prompt the to-be-identified object to learn an operation performed on the lip language prompt information, when providing the lip language prompt information, the terminal may further provide information that is used to prompt the to-be-identified object to read the lip language prompt information.

Step 203: Collect at least two frame pictures.

When the terminal has a front-facing camera, the terminal may collect at least two frame pictures of the to-be-identified object by taking a picture. The terminal may further collect at least two frame pictures of the to-be-identified object by shooting a video.

Step 204: Obtain lip changes of a to-be-identified object according to the at least two frame pictures, when the to-be-identified object reads at least two target characters.

After the terminal collects the at least two frame pictures, the terminal may obtain the lip changes of the to-be-identified object according to the at least two frame pictures, when the to-be-identified object reads the at least two target characters. In this embodiment, the to-be-identified object may read the characters by uttering a sound, or may read the characters only by moving the lip. This is not limited in this embodiment.

Optionally, this step may include:

a first step: determining pictures of the to-be-identified object in the at least two frame pictures, when the to-be-identified object reads the at least two target characters.

Specifically, when the to-be-identified object reads each character, generally there is a pause between neighboring characters, that is, a lip shape of the to-be-identified object remains unchanged between neighboring characters. Therefore, the terminal may determine a corresponding picture of to-be-identified object according to the pause, when the to-be-identified object reads each character, and selects a picture corresponding to each target character. Specifically, the terminal may select, according to a location of each target character in the lip language prompt information, a picture corresponding to the target character. When the lip language prompt information is generated by the terminal, the terminal may learn the location of each target character in advance according to a generation rule for generating the lip language prompt information. However, when the lip language prompt information is information obtained by the terminal from the server, when obtaining the lip language prompt information from the server, the terminal may further obtain the location of each target character in the lip language prompt information from the server. This is not limited in this embodiment.

For example, when the lip language prompt information is the information shown in FIG. 2C, because the target characters are respectively the first digit, the fourth digit, the third digit, and the eighth digit of the character string, the terminal may select pictures corresponding to the first digit, the fourth digit, the third digit, and the eighth digit in the at least two frame pictures.

a second step: extracting lip picture sequences of the to-be-identified object from the determined pictures, when the to-be-identified object reads the at least two target characters, the lip picture sequences being used to represent lip changes of the to-be-identified object.

By using facial recognition technologies, the terminal may detect whether there is a human face in the determined picture. When there is a human face, a location of the lip in the human face may be determined by means of a distinction between a lip color and a skin color. After the location of the lip is obtained, the terminal may determine whether a to-be-identified object in the picture has a lip change by using a model point method.

Figure 2D:
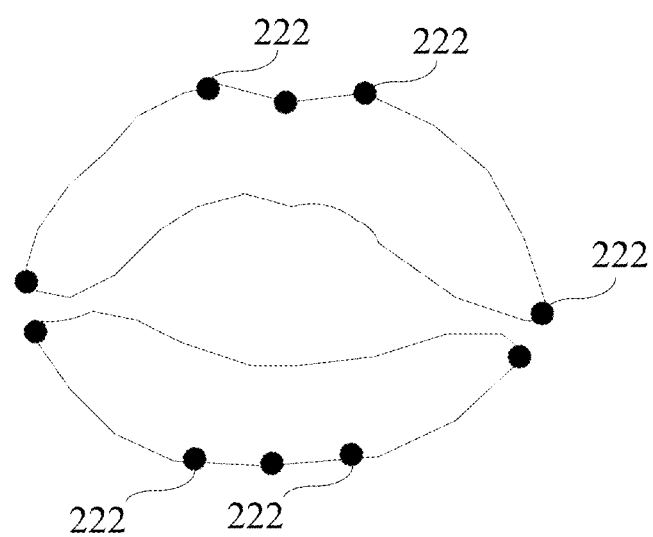
FIG. 2D is a schematic diagram of each model point of a lip according to another embodiment of the present invention.

The model point refers to an angular point on a curve at an edge of the lip. Referring to FIG. 2D, in a possible implementation manner, an upper edge of the lip may include 5 model points 222, and a lower edge of the lip may also include 5 model points 222.

The terminal may determine a location of each point on the lip by using the model point method, and form a state of a lip picture at a time point. The terminal extracts, according to a chronological order, a lip picture from a picture corresponding to each target character, and forms a lip picture sequence. The lip picture sequence is used to represent a lip change of the to-be-identified object, when the to-be-identified object reads the target character.

Step 205: Detect whether the lip changes of the to-be-identified object meet a preset condition.

After the terminal obtains a lip change of the to-be-identified object, when the to-be-identified object reads each target character, the terminal detects whether the lip change of the to-be-identified object meets the preset condition. Specifically, this step may include:

if the at least two target characters include the characters of the same lip shape, detecting whether lip changes of the to-be-identified object are the same, when the to-be-identified object reads the characters of the same lip shape. Optionally, the terminal may detect whether lip picture sequences of the to-be-identified object are the same, when the to-be-identified object reads characters of the same lip shape. If the lip picture sequences of the to-be-identified object are the same, it is determined that the lip changes of the to-be-identified object meet the preset condition; or otherwise, the lip changes of the to-be-identified object do not meet the preset condition.

Optionally, if there are two or more groups of characters of same lip shapes, the terminal may sequentially detect whether each group of characters of a same lip shape have a same lip picture sequence. Optionally, the terminal may further select lip picture sequences of at least one group of characters of a same lip shape of the two or more groups of characters of same lip shapes, and detect whether the lip picture sequences of each selected group are the same.

Optionally, if there are three or more characters in each group of characters of the same lip shape, the terminal may select lip picture sequences corresponding to n characters, and detect whether lip picture sequences of the selected n characters are the same. n is an integer greater than or equal to 2. The terminal may further detect whether a quantity of same sequences in the lip picture sequences of each group of characters of the same lip shape reaches a preset threshold. For example, there are four characters of the same lip shape. The terminal may detect whether a quantity of same sequences in lip picture sequences of the four characters reaches three, if the quantity reaches 3, the terminal determines that the preset condition is met, or otherwise, the terminal determines that the preset condition is not met.

if the at least two target characters comprise the characters of opposite lip shapes, detecting whether lip changes of the to-be-identified object are opposite, when the to-be-identified object reads the characters of opposite lip shapes; and A detection method herein is similar to that of the characters of the same lip shape. For technical details, refer to the foregoing descriptions, and details are not described herein again.

if the at least two target characters include the characters whose lip shape similarity is in the preset range, detecting whether a similarity between lip changes of the to-be-identified object is in the preset range, when the to-be-identified object reads the characters whose lip shape similarity is in the preset range.

Optionally, the terminal may input lip picture sequences of the at least two target characters to a hidden Markov model, and the hidden Markov model calculates a matching degree of each received lip picture sequence, and detects whether the matching degree is in the preset range. If the matching degree is in the preset range, it is determined that the preset condition is met; or otherwise, the preset condition is not met.

Step 206: Determine that the to-be-identified object is a living body, if the preset condition is met.

However, if a detection result is that the preset condition is not met, the terminal determines that the to-be-identified object is not a living body.

In conclusion, according to the living body identification method provided in this embodiment, at least two target characters are set in lip language prompt information, whether lip changes of a to-be-identified object in collected at least two frame pictures meet a preset condition is detected, when the to-be-identified object reads the at least two target characters; and it is determined that the to-be-identified object is a living body, when a detection result is that the preset condition is met. The at least two target characters are at least one of: characters of the same lip shape, characters of opposite lip shapes, or characters whose lip shape similarity is in a preset range. The living body identification method resolves a problem in the related technology that even if a to-be-identified object performs an operation according to lip language prompt information, a terminal may incorrectly determine that the to-be-identified object is not a living body, and achieves an effect that the terminal can accurately determine whether the to-be-identified object is a living body and improve determining accuracy.

The lip language prompt information in this embodiment is information randomly generated by a terminal, or information that is obtained from a server and randomly generated by the server. Therefore, this embodiment avoids a problem that when information is fixed, the terminal incorrectly determines that a video in which the lip language prompt information is read is a living body, and achieves an effect of improving determining accuracy.

Figure 2E:
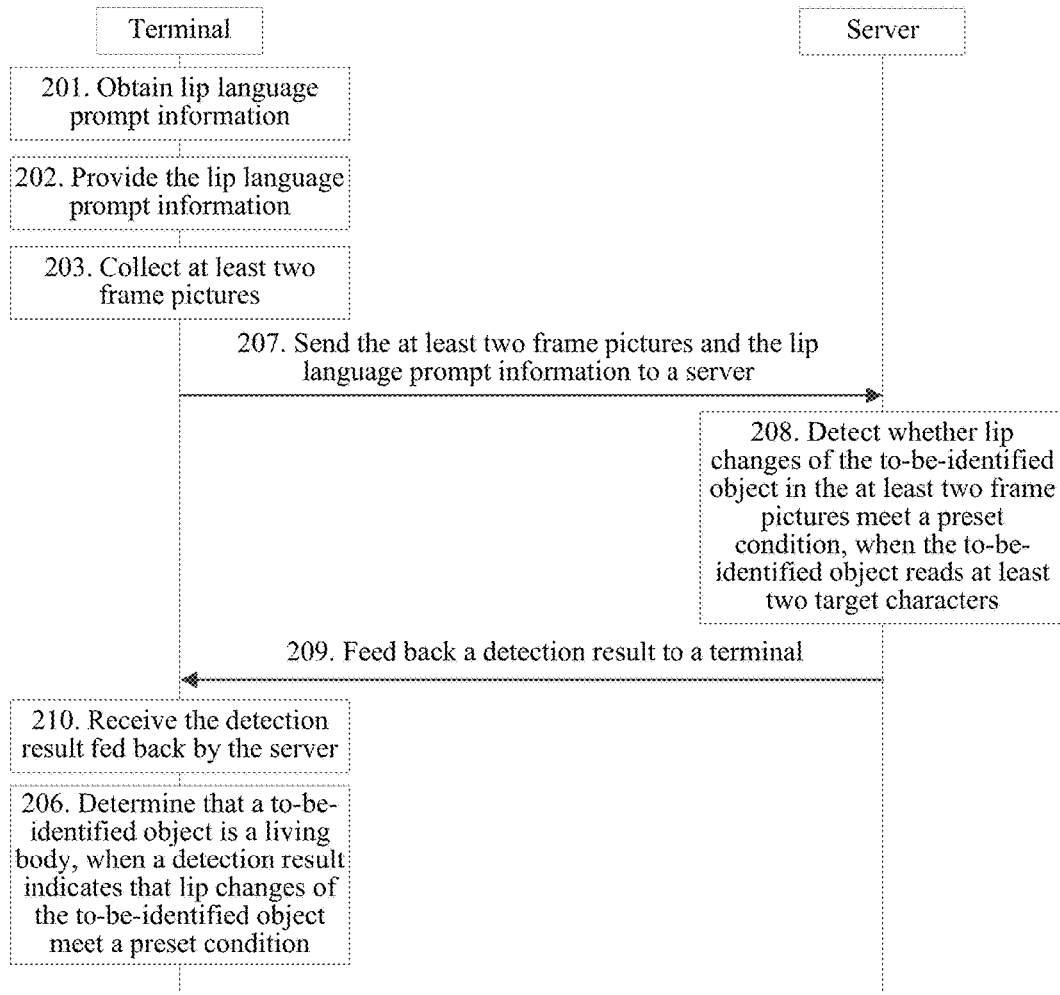
FIG. 2E is another flowchart of a living body identification method according to another embodiment of the present invention.

It should be noted that the foregoing embodiment exemplarily describes that the terminal detects whether lip changes of a to-be-identified object in at least two frame pictures meet a preset condition, when the to-be-identified object reads at least two target characters. Optionally, detection may also be performed by using a server. In this case, step 204 and step 205 in the foregoing embodiment may be replaced with step 207 to step 210. Referring to FIG. 2E, FIG. 2E is a flowchart of a living body identification method in this case.

Step 207: The terminal sends the at least two frame pictures and the lip language prompt information to a server.

Step 208: The server detects whether lip changes of the to-be-identified object in the at least two frame pictures meet a preset condition, when the to-be-identified object reads the at least two target characters.

Correspondingly, after the server receives the at least two frame pictures and the lip language prompt information, the server may detect whether the lip changes of the to-be-identified object in the at least two frame pictures meet the preset condition, when the to-be-identified object reads the at least two target characters. A detection method of the server is similar to that of the terminal. For technical details, refer to step 204 and step 205 in the foregoing embodiment, and details are not described herein again.

Step 209: The server feeds back a detection result to the terminal.

Step 210: The terminal receives the detection result fed back by the server.

Correspondingly, the terminal may receive the detection result fed back by the server. Correspondingly, step 206 may be: determining that the to-be-identified object is a living body, when the detection result indicates that the lip changes of the to-be-identified object meet the preset condition; and determining that the to-be-identified object is not a living body, when the detection result indicates that the lip changes of the to-be-identified object do not meet the preset condition.

When the lip language prompt information is information obtained by the terminal from the server, in step 207, the terminal may send only the at least two frame pictures to the server.

The lip language prompt information described in each embodiment above may be generated by a terminal, or may be generated by a server. Therefore, an embodiment of the present invention further provides a method for generating lip language prompt information that is used for living body identification. The method includes:

generating lip language prompt information according to a preset rule, the lip language prompt information including at least two target characters, the at least two target characters being at least one of: characters of a same lip shape, characters of opposite lip shapes, or characters whose lip shape similarity is in a preset range, and the lip language prompt information being used to instruct a terminal to identify whether a to-be-identified object is a living body according to the lip language prompt information.

Optionally, the method may be applied to a terminal, to may be applied to a server.

When the method is applied to a terminal, the terminal may generate the lip language prompt information according to the preset rule when the terminal detects that a collected picture includes a human face. Optionally, the terminal may generate the lip language prompt information at any time, and store the generated lip language prompt information.

When the method is applied to a server, the server may generate the lip language prompt information in advance, and provide the lip language prompt information to a terminal. Optionally, after generating the lip language prompt information, the server may automatically send the lip language prompt information to a terminal; or after receiving an information obtaining request sent by a terminal, the server returns the lip language prompt information to the terminal. In addition, the server may generate the lip language prompt information after receiving a trigger request sent by a terminal, and send the lip language prompt information to the terminal.

In addition, when a terminal or a server generates the lip language prompt information, the terminal or the server may randomly generate the lip language prompt information. This is not limited in this embodiment.

In conclusion, according to the method for generating lip language prompt information that is used for living body identification, lip language prompt information that includes at least two target characters is generated, the at least two target characters being least one type of: characters of the same lip shape, characters of opposite lip shapes, or characters whose lip shape similarity is in a preset range. Therefore, when a terminal performs living body identification according to the lip language prompt information, the terminal can determine whether a to-be-identified object is a living body according to lip changes of the to-be-identified object, when the to-be-identified object reads the at least two target characters. The method resolves a problem in the related technology that even if a to-be-identified object performs an operation according to lip language prompt information, a terminal may incorrectly determine that the to-be-identified object is not a living body, and achieves an effect that the terminal can accurately determine whether the to-be-identified object is a living body and improve determining accuracy.

Figure 3:
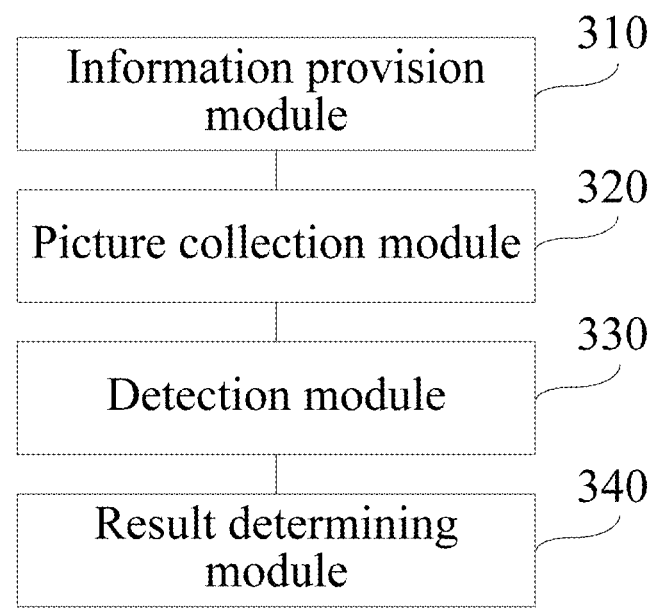
FIG. 3 is a structural block diagram of a living body identification apparatus according to an embodiment of the present invention.

Referring to FIG. 3, FIG. 3 is a structural block diagram of a living body identification apparatus according to an embodiment of the present invention. In this embodiment, the living body identification apparatus is applied to a terminal for exemplary description. The living body identification apparatus may be implemented as the terminal or a part of the terminal by means of software, hardware, or a combination thereof. The apparatus includes: an information provision module 310, a picture collection module 320, a detection module 330, and a result determining module 340.

The information provision module 310 is configured to provide lip language prompt information, the lip language prompt information including at least two target characters, and the at least two target characters being at least one of: characters of a same lip shape, characters of opposite lip shapes, or characters whose lip shape similarity is in a preset range.

The picture collection module 320 is configured to collect at least two frame pictures.

The detection module 330 is configured to detect whether lip changes of a to-be-identified object in the at least two frame pictures collected by the picture collection module 320 meet a preset condition, when the to-be-identified object reads the at least two target characters.

The result determining module 340 is configured to determine that the to-be-identified object is a living body, when a detection result of the detection module 330 is that the preset condition is met.

In conclusion, the living body identification apparatus provided in this embodiment sets at least two target characters in lip language prompt information, detects whether lip changes of a to-be-identified object in collected at least two frame pictures meet a preset condition, when the to-be-identified object reads the at least two target characters, and determines that the to-be-identified object is a living body, when a detection result is that the preset condition is met. The at least two target characters are at least one of: characters of the same lip shape, characters of opposite lip shapes, or characters whose lip shape similarity is in a preset range. The living body identification apparatus resolves a problem in the related technology that even if a to-be-identified object performs an operation according to lip language prompt information, a terminal may incorrectly determine that the to-be-identified object is not a living body, and achieves an effect that the terminal can accurately determine whether the to-be-identified object is a living body and improve determining accuracy.

Figure 4:
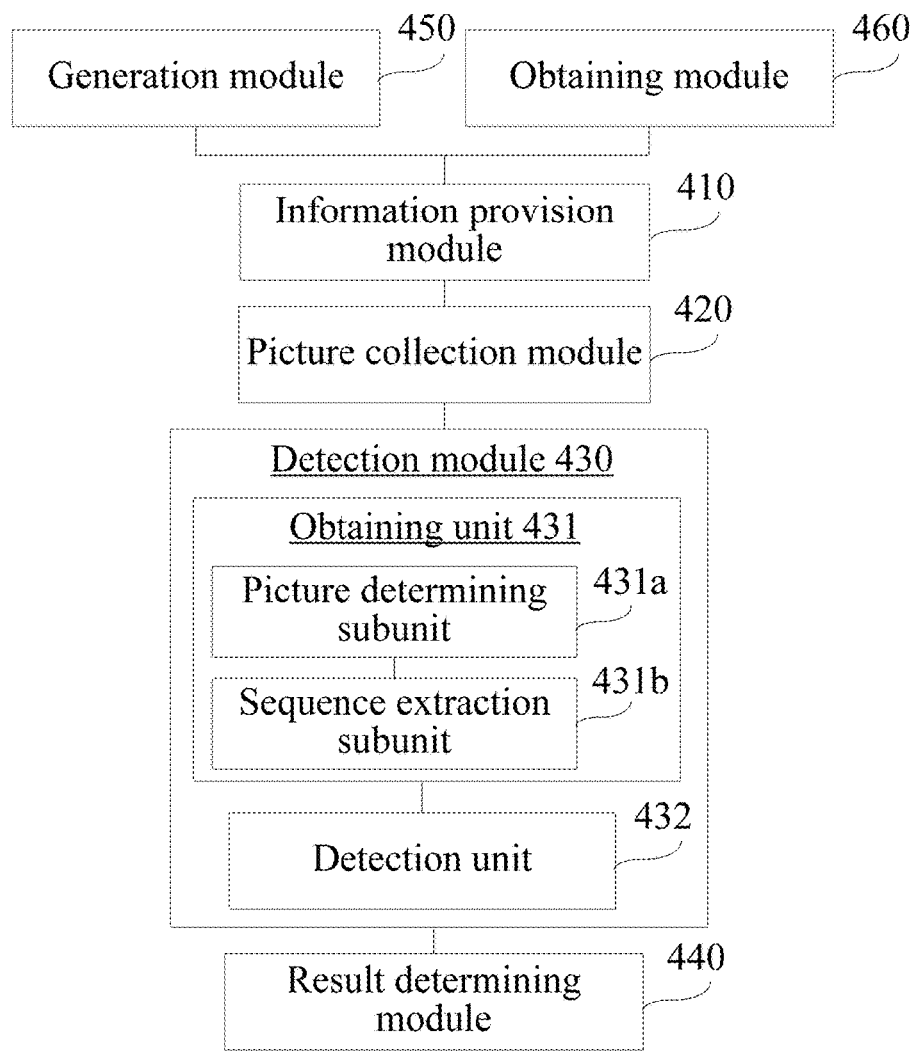
FIG. 4 is a structural block diagram of a living body identification apparatus according to another embodiment of the present invention.

Referring to FIG. 4, FIG. 4 is a structural block diagram of a living body identification apparatus according to another embodiment of the present invention. In this embodiment, the living body identification apparatus is applied to a terminal for exemplary description. The living body identification apparatus may be implemented as the terminal or a part of the terminal by means of software, hardware, or a combination thereof. The apparatus includes: an information provision module 410, a picture collection module 420, a detection module 430, and a result determining module 440.

The information provision module 410 is configured to provide lip language prompt information, the lip language prompt information including at least two target characters, and the at least two target characters being at least one of: characters of a same lip shape, characters of opposite lip shapes, or characters whose lip shape similarity is in a preset range.

The picture collection module 420 is configured to collect at least two frame pictures.

The detection module 430 is configured to detect whether lip changes of a to-be-identified object in the at least two frame pictures acquired by the picture collection module 420 meet a preset condition, when the to-be-identified object reads the at least two target characters.

The result determining module 440 is configured to determine that the to-be-identified object is a living body, when a detection result of the detection module 430 is that the preset condition is met.

Optionally, the detection module 430 includes:

an obtaining unit 431, configured to obtain the lip changes of the to-be-identified object according to the at least two frame pictures, when the to-be-identified object reads the at least two target characters; and a detection unit 432, configured to: if the at least two target characters include the characters of the same lip shape, detect whether lip changes of the to-be-identified object are the same, when the to-be-identified object reads the characters of the same lip shape; if the at least two target characters include the characters of opposite lip shapes, detect whether lip changes of the to-be-identified object are opposite, when the to-be-identified object reads the characters of opposite lip shapes; and if the at least two target characters include the characters whose lip shape similarity is in the preset range, detect whether a similarity between lip changes of the to-be-identified object is in the preset range, when the to-be-identified object reads the characters whose lip shape similarity is in the preset range.

Optionally, the obtaining unit 431 includes:

a picture determining subunit 431a, configured to determine pictures of the to-be-identified object in the at least two frame pictures, when the to-be-identified object reads the at least two target characters; and a sequence extraction subunit 431b, configured to extract lip picture sequences of the to-be-identified object from the pictures determined by the picture determining subunit 431a, when the to-be-identified object reads the at least two target characters, the lip picture sequences being used to represent lip changes of the to-be-identified object.

Optionally, the detection module 430 is further configured to send the at least two frame pictures and the lip language prompt information to a server, the server being configured to detect whether the lip changes of the to-be-identified object in the at least two frame pictures meet the preset condition, when the to-be-identified object reads the at least two target characters.

Optionally, the apparatus further includes:

a generation module 450, configured to generate the lip language prompt information that includes the at least two target characters; or an obtaining module 460, configured to obtain the lip language prompt information that includes the at least two target characters from the server, the lip language prompt information being information generated by the server in advance.

In conclusion, the living body identification apparatus provided in this embodiment sets at least two target characters in lip language prompt information, detects whether lip changes of a to-be-identified object in collected at least two frame pictures meet a preset condition, when the to-be-identified object reads the at least two target characters, and determines that the to-be-identified object is a living body, when a detection result is that the preset condition is met. The at least two target characters are at least one of: characters of the same lip shape, characters of opposite lip shapes, or characters whose lip shape similarity is in a preset range. The living body identification apparatus resolves a problem in the related technology that even if a to-be-identified object performs an operation according to lip language prompt information, a terminal may incorrectly determine that the to-be-identified object is not a living body, and achieves an effect that the terminal can accurately determine whether the to-be-identified object is a living body and improve determining accuracy.

Figure 5:
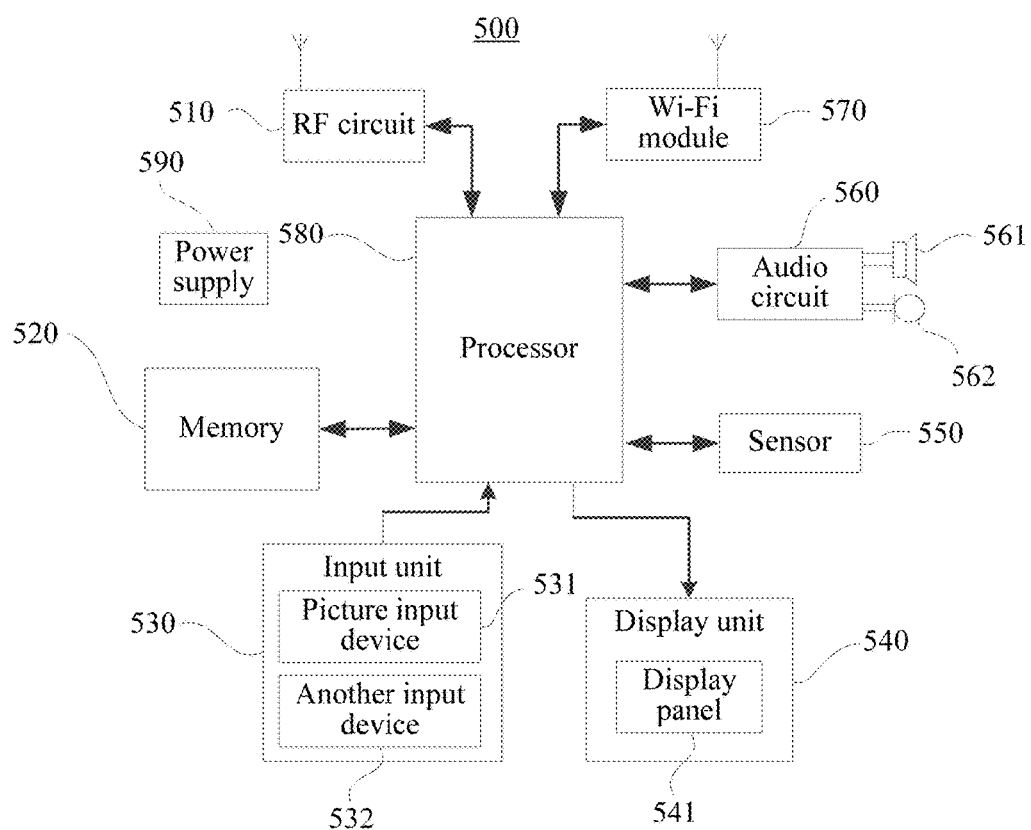
FIG. 5 is a structural block diagram of a terminal according to an embodiment of the present invention.

Referring to FIG. 5, FIG. 5 shows a schematic structural diagram of a terminal according to an embodiment of the present invention. The terminal is configured to implement the living body identification method provided in the foregoing embodiments or the method for generating lip language prompt information that is used for living body identification.

Specifically, the terminal 500 may include components such as a radio frequency (RF) circuit 510, a memory 520 including one or more computer readable storage media, an input unit 530, a display unit 540, a sensor 550, an audio circuit 560, a wireless fidelity (Wi-Fi) module 570, a processor 580 including one or more processing cores, and a power supply 590. A person skilled in the art may understand that a terminal structure shown in FIG. 5 constitutes no limitation to the terminal, and the terminal may include more or fewer components than those shown in the figure, or some components may be combined, or a different component deployment may be used.

The RF circuit 510 may be configured to receive and send signals during an information receiving and sending process or a call process. Particularly, after the RF circuit 110 receives downlink information from a base station, the RF circuit 510 delivers the downlink information to one or more processors 580 for processing, and sends related uplink data to the base station. Usually, the RF circuit 510 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 510 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), or the like.

The memory 520 may be configured to store a software program and module. The processor 580 runs the software program and module stored in the memory 520, to implement various functional applications and data processing. The memory 520 may mainly include a program storage area and a data storage area. The program storage area may store an operating system, an application program required by at least one function (such as a sound playback function and a picture display function), and the like. The data storage area may store data (such as audio data and an address book) created according to use of the terminal device 500, and the like. In addition, the memory 520 may include a high speed random access memory, and may also include a non-volatile memory, such as at least one magnetic disk storage device, a flash memory, or another volatile solid-state storage device. Correspondingly, the memory 520 may further include a memory controller, to provide the processor 580 and the input unit 530 accesses to the memory 520.

The input unit 530 may be configured to receive input figure or character information, and generate a keyboard, mouse, joystick, optical or trackball signal input related to a user setting and function control. Specifically, the input unit 530 may include a picture input device 531 and another input device 532. The picture input device 531 may be a camera, or may be a photoelectric scanning device. In addition to the picture input device 531, the input unit 530 may further include the another input device 532. Specifically, the another input device 532 may include, but is not limited to, one or more of a physical keyboard, a functional key (such as a volume control key or a switch key), a track ball, a mouse, and a joystick.

The display unit 540 may be configured to display information input by the user or information provided for the user, and various graphical user interfaces of the terminal 500. The graphical user interfaces may be formed by a graph, a text, an icon, a video, or any combination thereof. The display unit 540 may include a display panel 541. Optionally, the display panel 541 may be configured by using a liquid crystal display (LCD), an organic light-emitting diode (OLED), or the like.

The terminal 500 may further include at least one sensor 550, such as an optical sensor, a motion sensor, and other sensors. Specifically, the optical sensor may include an ambient light sensor and a proximity sensor. The ambient light sensor can adjust luminance of the display panel 541 according to brightness of the ambient light. The proximity sensor may switch off the display panel 541 and/or backlight when the terminal 500 is moved to the ear. As one type of motion sensors, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 500, are not further described herein.

The audio circuit 560, a loudspeaker 561, and a microphone 562 may provide an audio interface between the user and the terminal 500. The audio circuit 560 may convert received audio data into an electric signal and transmit the electric signal to the loudspeaker 561. The loudspeaker 561 converts the electric signal into a sound signal for outputting. On the other hand, the microphone 562 converts a collected sound signal into an electric signal. The audio circuit 560 receives the electric signal and converts the electric signal into audio data, and outputs the audio data to the processor 580 for processing. Then, the processor 180 sends the audio data to, for example, another terminal by using the RF circuit 510, or outputs the audio data to the memory 520 for further processing. The audio circuit 560 may further include an earplug jack, to provide communication between a peripheral earphone and the terminal 500.

WiFi belongs to a short distance wireless transmission technology, and provides a wireless broadband Internet access for the user. The terminal 500 may help the user to receive and send e-mails, browse a webpage, access streaming media, and the like by using the WiFi module 570. Although FIG. 5 shows the WiFi module 570, it may be understood that the WiFi module 570 is not a necessary component of the terminal 500, and when required, the wireless communications unit may be omitted as long as the scope of the essence of the present disclosure is not changed.

The processor 580 is the control center of the terminal 500, and is connected to various parts of a mobile phone by using various interfaces and lines. By running or performing the software program and/or module stored in the memory 520, and calling data stored in the memory 520, the processor 580 performs various functions and data processing of the terminal 500, thereby performing overall monitoring on the mobile phone. Optionally, the processor 580 may include one or more processing cores. Preferably, the processor 580 may integrate an application processor and a modem processor. The application processor mainly processes an operating system, a user interface, an application program and the like, and the modem processor mainly processes wireless communication. It may be understood that the foregoing modem processor may also not be integrated into the processor 580.

The terminal 500 further includes the power supply 590 (such as a battery) for supplying power to the components. Preferably, the power supply may be logically connected to the processor 580 by using a power management system, thereby implementing functions such as charging, discharging and power consumption management by using the power management system. The power supply 590 may further include one or more of a direct current or alternating current power supply, a re-charging system, a power supply failure detection circuit, a power supply converter or inverter, a power supply state indicator, and any other components.

Although it is not shown in the figure, the terminal 500 may further include a Bluetooth module, and the like, and details are not further described herein.

Specifically, in this embodiment, the terminal 500 further includes a memory and one or more programs. The one or more programs are stored in the memory and configured to be executed by one or more processors. The one or more programs include an instruction for performing the living body identification method, or the method for generating lip language prompt information that is used for living body identification provided in the foregoing embodiments.

In an exemplary embodiment, a non-transitory computer readable storage medium that includes an instruction is further provided, such as a memory that includes an instruction. The instruction may be performed by a processor of a mobile terminal, to implement the living body identification method or the method for generating lip language prompt information that is used for living body identification. For example, the non-transitory computer readable storage medium may be an ROM, a random access memory (RAM), a CD-ROM, a magnetic tape, a floppy disk, an optical data storage device, or the like.

It should be noted that: when the living body identification apparatus provided in the foregoing embodiments performs living body identification, classification of the foregoing functional modules is only for exemplary purpose. In an actual application, the foregoing functions may be allocated to different functional modules for implementation according to needs. That is, the internal structure of the device is divided into different functional modules, so as to implement all or some of the functions described above. In addition, the living body identification apparatus and the living body identification method provided in the foregoing embodiments are based on the same idea. For a specific implementation process of the living body identification apparatus, refer to the method embodiments, and details are not described herein again.

The sequence numbers of the foregoing embodiments of the present invention are merely for description purposes, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, or an optical disc.

The foregoing descriptions are merely exemplary embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A method for living body identification, comprising:
providing, by a device comprising a memory and a processor in communication with the memory, lip language prompt information, wherein the lip language prompt information comprises at least two target characters, and the at least two target characters are at least one of: characters of a same lip shape, characters of opposite lip shapes, or characters whose lip shape similarity is in a preset range, wherein the preset range is a range formed by a first threshold and a second threshold, the first threshold is a value greater than 0, and the second threshold is a value less than 1;
collecting, by the device, at least two frame pictures when a to-be-identified object reads the at least two target characters;
identifying, by the device, a lip of the to-be-identified object in each of the at least two frame pictures;
identifying, by the device, a first plurality of model points on an upper edge of the lip and a second plurality of model points on a lower edge of the lip in each of the at least two frame pictures;
performing, by the device, a model point method according to the first plurality of model points and the second plurality of model points in each of the at least two frame pictures to determine a first lip change of the to-be-identified object when the to-be-identified object read a first character of the at least two target characters and a second lip change of the to-be-identified object when the to-be-identified object read a second character of the at least two target characters, the first lip change and the second lip change comprising at least one of a lip shape change, a lip texture change, or a lip color change;
detecting, by the device, whether the first lip change and the second lip change meet a preset condition;
when it is detected that the first lip change and the second lip change meet the preset condition, determining, by the device, that the to-be-identified object is a living body;
when it is detected that the first lip change and the second lip change do not meet the preset condition, determining, by the device, that the to-be-identified object is not a living body; and
wherein the detecting whether the first lip change and the second lip change meet the preset condition comprises:
when the at least two target characters comprise the characters of the same lip shape, comparing, by the device, the first lip change and the second lip change to determine whether the first lip change and the second lip change are same, wherein, when the first lip change and the second lip change are the same, the preset condition is met,
when the at least two target characters comprise the characters of the opposite lip shapes, comparing, by the device, the first lip change and the second lip change to determine whether the first lip change and the second lip change are opposite, wherein, when the first lip change and the second lip change are the opposite, the preset condition is met, and
when the at least two target characters comprise the characters whose lip shape similarity is in the preset range, comparing, by the device, the first lip change and the second lip change to determine whether a similarity between the first lip change and the second lip change is in the preset range, wherein, when the similarity between the first lip change and the second lip change is in the preset range, the preset condition is met.

2. The method according to claim 1, wherein before the providing the lip language prompt information, the method further comprises:
generating, by the device, the lip language prompt information that comprises the at least two target characters; or
obtaining, by the device, the lip language prompt information that comprises the at least two target characters from a server, wherein the lip language prompt information is generated by the server in advance.

3. The method according to claim 1, wherein the obtaining the first lip change and the second lip change according to the at least two frame pictures comprises:

determining, by the device, pictures of the to-be-identified object in the at least two frame pictures, when the to-be-identified object reads the at least two target characters; and extracting, by the device, lip picture sequences of the to-be-identified object from the determined pictures, when the to-be-identified object reads the at least two target characters, wherein the lip picture sequences are used to represent lip changes of the to-be-identified object.

4. The method according to claim 3, wherein before the providing the lip language prompt information, the method further comprises:

generating, by the device, the lip language prompt information that comprises the at least two target characters; or obtaining, by the device, the lip language prompt information that comprises the at least two target characters from a server, wherein the lip language prompt information is generated by the server in advance.

5. The method according to claim 1, wherein before the providing the lip language prompt information, the method further comprises:

generating, by the device, the lip language prompt information that comprises the at least two target characters; or obtaining, by the device, the lip language prompt information that comprises the at least two target characters from a server, wherein the lip language prompt information is generated by the server in advance.

6. The method according to claim 1, wherein the detecting whether the first lip change and the second lip change meet the preset condition comprises:

sending, by the device, the at least two frame pictures and the lip language prompt information to a server, wherein the server is configured to detect whether the first lip change and the second lip change meet the preset condition.

7. The method according to claim 6, wherein before the providing the lip language prompt information, the method further comprises:

generating, by the device, the lip language prompt information that comprises the at least two target characters; or obtaining, by the device, the lip language prompt information that comprises the at least two target characters from the server, wherein the lip language prompt information is generated by the server in advance.

8. A terminal, comprising:
a memory storing at least one set of instructions;
at least one processor in communication with the memory; and
when the at least one processor executes the at least one set of the instructions, the at least one processor is configured to cause the terminal to perform:

providing lip language prompt information, wherein the lip language prompt information comprises at least two target characters, and the at least two target characters are at least one of: characters of a same lip shape, characters of opposite lip shapes, or characters whose lip shape similarity is in a preset range, wherein the preset range is a range formed by a first threshold and a second threshold, the first threshold is a value greater than 0, and the second threshold is a value less than 1, collecting at least two frame pictures when a to-be-identified object reads the at least two target characters, identifying a lip of the to-be-identified object in each of the at least two frame pictures, identifying a first plurality of model points on an upper edge of the lip and a second plurality of model points on a lower edge of the lip in each of the at least two frame pictures, performing a model point method according to the first plurality of model points and the second plurality of model points in each of the at least two frame pictures to determine a first lip change of the to-be-identified object when the to-be-identified object read a first character of the at least two target characters and a second lip change of the to-be-identified object when the to-be-identified object read a second character of the at least two target characters, the first lip change and the second lip change comprising at least one of a lip shape change, a lip texture change, or a lip color change, detecting whether the first lip change and the second lip change meet a preset condition, when it is detected that the first lip change and the second lip change meet the preset condition, determining that the to-be-identified object is a living body, when it is detected that the first lip change and the second lip change do not meet the preset condition, determining that the to-be-identified object is not a living body, wherein the detecting whether the first lip change and the second lip change meet the preset condition comprises:

when the at least two target characters comprise the characters of the same lip shape, comparing the first lip change and the second lip change to determine whether the first lip change and the second lip change are same, wherein, when the first lip change and the second lip change are the same, the preset condition is met;

when the at least two target characters comprise the characters of the opposite lip shapes, comparing the first lip change and the second lip change to determine whether the first lip change and the second lip change are opposite, wherein, when the first lip change and the second lip change are the opposite, the preset condition is met; and when the at least two target characters comprise the characters whose lip shape similarity is in the preset range, comparing the first lip change and the second lip change to determine whether a similarity between the first lip change and the second lip change is in the preset range, wherein, when the similarity between the first lip change and the second lip change is in the preset range, the preset condition is met.

9. The terminal according to claim 8, wherein, when the at least one processor executes the at least one set of the instructions, the at least one processor is configured to further cause the terminal to perform:

generating the lip language prompt information that comprises the at least two target characters before providing the lip language prompt information; or obtaining the lip language prompt information that comprises the at least two target characters from a server before providing the lip language prompt information, wherein the lip language prompt information is generated by the server in advance.

10. The terminal according to claim 8, wherein, when the at least one processor executes the at least one set of the instructions, the at least one processor is configured to further cause the terminal to perform:
generating the lip language prompt information that comprises the at least two target characters before providing the lip language prompt information; or
obtaining the lip language prompt information that comprises the at least two target characters from a server before providing the lip language prompt information, wherein the lip language prompt information is generated by the server in advance.

11. The terminal according to claim 8, wherein, the at least one processor is configured to cause the terminal to perform the obtaining the first lip change and the second lip change according to the at least two frame pictures, the at least one processor is configured to cause the terminal to perform:
determining pictures of the to-be-identified object in the at least two frame pictures, when the to-be-identified object reads the at least two target characters; and
extracting lip picture sequences of the to-be-identified object from the determined pictures, when the to-be-identified object reads the at least two target characters, wherein the lip picture sequences are used to represent lip changes of the to-be-identified object.

12. The terminal according to claim 11, wherein, when the at least one processor executes the at least one set of the instructions, the at least one processor is configured to further cause the terminal to perform:
generating the lip language prompt information that comprises the at least two target characters before providing the lip language prompt information; or
obtaining the lip language prompt information that comprises the at least two target characters from a server before providing the lip language prompt information, wherein the lip language prompt information is generated by the server in advance.

13. The terminal according to claim 8, wherein, when the at least one processor is configured to cause the terminal to perform the detecting whether the first lip change and the second lip change meet the preset condition, the at least one processor is configured to cause the terminal to perform:
sending the at least two frame pictures and the lip language prompt information to a server, wherein the server is configured to detect whether the first lip change and the second lip change meet the preset condition.

14. The terminal according to claim 13, wherein, when the at least one processor executes the at least one set of the instructions, the at least one processor is configured to further cause the terminal to perform:
generating the lip language prompt information that comprises the at least two target characters before providing the lip language prompt information; or
obtaining the lip language prompt information that comprises the at least two target characters from the server before providing the lip language prompt information, wherein the lip language prompt information is generated by the server in advance.

15. A non-transitory computer readable storage medium storing instructions, wherein the instructions, when executed by a processor, cause the processor to perform:
providing lip language prompt information, wherein the lip language prompt information comprises at least two target characters, and the at least two target characters are at least one of: characters of a same lip shape, characters of opposite lip shapes, or characters whose lip shape similarity is in a preset range, wherein the preset range is a range formed by a first threshold and a second threshold, the first threshold is a value greater than 0, and the second threshold is a value less than 1,
collecting at least two frame pictures when a to-be-identified object reads the at least two target characters,
identifying a lip of the to-be-identified object in each of the at least two frame pictures,
identifying a first plurality of model points on an upper edge of the lip and a second plurality of model points on a lower edge of the lip in each of the at least two frame pictures,
performing a model point method according to the first plurality of model points and the second plurality of model points in each of the at least two frame pictures to determine a first lip change of the to-be-identified object when the to-be-identified object read a first character of the at least two target characters and a second lip change of the to-be-identified object when the to-be-identified object read a second character of the at least two target characters, the first lip change and the second lip change comprising at least one of a lip shape change, a lip texture change, or a lip color change,
detecting whether the first lip change and the second lip change meet a preset condition,
when it is detected that the first lip change and the second lip change meet the preset condition, determining that the to-be-identified object is a living body,
when it is detected that the first lip change and the second lip change do not meet the preset condition, determining that the to-be-identified object is not a living body, and
wherein the detecting whether the first lip change and the second lip change meet the preset condition comprises:
when the at least two target characters comprise the characters of the same lip shape, comparing the first lip change and the second lip change to determine whether the first lip change and the second lip change are same, wherein, when the first lip change and the second lip change are the same, the preset condition is met,
when the at least two target characters comprise the characters of the opposite lip shapes, comparing the first lip change and the second lip change to determine whether the first lip change and the second lip change are opposite, wherein, when the first lip change and the second lip change are the opposite, the preset condition is met, and
when the at least two target characters comprise the characters whose lip shape similarity is in the preset range, comparing the first lip change and the second lip change to determine whether a similarity between the first lip change and the second lip change is in the preset range, wherein, when the similarity between the first lip change and the second lip change is in the preset range, the preset condition is met.

16. The non-transitory computer readable storage medium according to claim 15, wherein the instructions, when executed by the processor, further cause the processor to perform:

generating the lip language prompt information that comprises the at least two target characters before providing the lip language prompt information; or obtaining the lip language prompt information that comprises the at least two target characters from a server before providing the lip language prompt information, wherein the lip language prompt information is generated by the server in advance.

17. The non-transitory computer readable storage medium according to claim 15, wherein, when the instructions cause the processor to perform the detecting whether the first lip change and the second lip change meet the preset condition, the instructions cause the processor to perform:

sending the at least two frame pictures and the lip language prompt information to a server, wherein the server is configured to detect whether the first lip change and the second lip change meet the preset condition.

\* \* \* \* \*